United States Patent
Lee et al.

(10) Patent No.: US 9,173,149 B2
(45) Date of Patent: Oct. 27, 2015

(54) METHOD FOR ADJUSTING CELL RESELECTION PRIORITY FOR AVOIDING IDC INTERFERENCE IN WIRELESS COMMUNICATION SYSTEM AND DEVICE FOR SAME

(75) Inventors: Jaewook Lee, Anyang-si (KR);
Seungjune Yi, Anyang-si (KR);
Youngdae Lee, Anyang-si (KR);
Sungduck Chun, Anyang-si (KR);
Sungjun Park, Anyang-si (KR);
Sunghoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 298 days.

(21) Appl. No.: 13/822,605

(22) PCT Filed: Oct. 18, 2011

(86) PCT No.: PCT/KR2011/007741
§ 371 (c)(1),
(2), (4) Date: Mar. 12, 2013

(87) PCT Pub. No.: WO2012/053800
PCT Pub. Date: Apr. 26, 2012

(65) Prior Publication Data
US 2013/0176885 A1    Jul. 11, 2013

Related U.S. Application Data

(60) Provisional application No. 61/405,232, filed on Oct. 21, 2010.

(51) Int. Cl.
*G01R 31/08* (2006.01)
*H04W 36/30* (2009.01)
(Continued)

(52) U.S. Cl.
CPC .......... *H04W 36/30* (2013.01); *H04W 36/0083* (2013.01); *H04J 11/0069* (2013.01); *H04W 36/14* (2013.01); *H04W 88/06* (2013.01)

(58) Field of Classification Search
CPC . H04W 16/14; H04W 72/042; H04W 72/082; H04W 88/06; H04W 36/30; H04W 36/08; H04W 24/08; H04W 76/028; H04W 60/04; H04W 48/20; H04W 28/04; H04W 28/18; H04W 24/00; H04W 84/18
See application file for complete search history.

(56) References Cited

U.S. PATENT DOCUMENTS

2008/0293419 A1* 11/2008 Somasundaram et al. .... 455/437
2009/0010219 A1* 1/2009 Lee et al. ...................... 370/329
(Continued)

FOREIGN PATENT DOCUMENTS

CN    101478744 A    7/2009
CN    101527940 A    9/2009
(Continued)

OTHER PUBLICATIONS

CMCC, "New Study Item Proposal: Signalling and procedure for in-device coexistence interference avoidance," 3GPP TSG RAN#48, Jun. 1-4, 2010, 5 pages, RP-100671.
(Continued)

*Primary Examiner* — Jung-Jen Liu
(74) *Attorney, Agent, or Firm* — Birch, Stewart, Kolasch & Birch, LLP

(57) ABSTRACT

The present invention discloses a method for a first communication module of a user equipment measuring for cell reselection in a wireless communication system. More particularly, the present invention comprises the following steps: receiving a first message including at least one frequency priority list from a base station; receiving a second message from at one or more second communication modules which coexist in the terminal; and measuring the frequency based on the at least one frequency priority list and the operating frequency information that is included in the second message, when the second message indicates the beginning of the operation of the one or more second communication modules.

8 Claims, 7 Drawing Sheets

(51) Int. Cl.
*H04W 36/00* (2009.01)
*H04J 11/00* (2006.01)
*H04W 36/14* (2009.01)
*H04W 88/06* (2009.01)

(56) References Cited

U.S. PATENT DOCUMENTS

| | | | |
|---|---|---|---|
| 2010/0093350 A1* | 4/2010 | Wang et al. | 455/436 |
| 2010/0113019 A1* | 5/2010 | Jeong et al. | 455/435.2 |
| 2010/0222055 A1* | 9/2010 | Cho et al. | 455/434 |
| 2010/0273485 A1 | 10/2010 | Huang et al. | |
| 2010/0304685 A1* | 12/2010 | Wietfeldt et al. | 455/67.11 |
| 2011/0105122 A1* | 5/2011 | Wu | 455/436 |
| 2011/0117954 A1* | 5/2011 | Iwamura et al. | 455/525 |
| 2011/0242969 A1* | 10/2011 | Dayal et al. | 370/225 |
| 2012/0020231 A1* | 1/2012 | Chen et al. | 370/252 |
| 2012/0039226 A1* | 2/2012 | Yang et al. | 370/311 |
| 2013/0208610 A1* | 8/2013 | Mach, Tomasz | 370/252 |
| 2013/0223235 A1* | 8/2013 | Hu et al. | 370/242 |

FOREIGN PATENT DOCUMENTS

| | | |
|---|---|---|
| EP | 1 871 133 A1 | 12/2007 |
| EP | 2222115 A1 | 8/2010 |
| KR | 10-2007-0080556 A | 8/2007 |
| KR | 10-2007-0110366 A | 11/2007 |
| KR | 10-2009-0029628 A | 3/2009 |
| KR | 10-2010-0052456 A | 5/2010 |

OTHER PUBLICATIONS

LG Electronics Inc., "Possible Solutions for In-device Interference Avoidance," 3GPP TSG-RAN2 Meeting #71, Aug. 23-27, 2010, pp. 1-2, R2-104880.

* cited by examiner (a) Control-plane protocol stack (b) User-plane protocol stack

METHOD FOR ADJUSTING CELL RESELECTION PRIORITY FOR AVOIDING IDC INTERFERENCE IN WIRELESS COMMUNICATION SYSTEM AND DEVICE FOR SAME

CROSS REFERENCE TO RELATED APPLICATIONS

This application is the National Phase of PCT/KR2011/007741 filed on Oct. 18, 2011, which claims priority under 35 U.S.C. 119(e) to U.S. Provisional Application No. 61/405,232 filed on Oct. 21, 2010, all of which are hereby expressly incorporated by reference into the present application.

TECHNICAL FIELD

The present invention relates to a wireless communication system, and more particularly, to a method of adjusting a cell reselection priority for an IDC interference evasion in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Task

The present invention provides a method of adjusting a cell reselection priority for an IDC interference evasion in a wireless communication system and apparatus therefor.

Technical Solution

To achieve these and other advantages and in accordance with the purpose of the present invention, as embodied and broadly described, a method of performing a measurement, which is performed for a cell reselection by a $1^{st}$ communication module of a user equipment in a wireless communication system, according to one embodiment of the present invention includes the steps of receiving a $1^{st}$ message including at least one frequency priority list from a base station, receiving a $2^{nd}$ message from at least one $2^{nd}$ communication module coexisting in the user equipment, and if the $2^{nd}$ message indicates an operation start of the at least one $2^{nd}$ communication module, performing a frequency measurement based on the at least one frequency priority list and an operating frequency information of the $2^{nd}$ communication module included in the $2^{nd}$ message.

To further achieve these and other advantages and in accordance with the purpose of the present invention, as embodied and broadly described, a user equipment in a wireless communication system according to another embodiment of the present invention includes a $1^{st}$ communication module configured to transceive signals with a $1^{st}$ communication system and at least one $2^{nd}$ communication module configured to transceive signals with a different communication system, wherein the $1^{st}$ communication module receives a $1^{st}$ message including at least one frequency priority list from a base station, the $1^{st}$ communication module receives a $2^{nd}$ message from at least one $2^{nd}$ communication module coexisting in the user equipment, and wherein if the $2^{nd}$ message indicates an operation start of the at least one $2^{nd}$ communication module, the $1^{st}$ communication module performs a frequency measurement based on the at least one frequency priority list and an operating frequency information of the $2^{nd}$ communication module included in the $2^{nd}$ message.

Preferably, the $1^{st}$ message includes a $1^{st}$ frequency priority list including an operating frequency of the at least one $2^{nd}$ communication module and a $2^{nd}$ frequency priority list except the operating frequency of the at least one $2^{nd}$ communication module. More preferably, the frequency measurement is performed based on the $2^{nd}$ frequency priority list. More preferably, if the measurement for the cell reselection is performed before the $2^{nd}$ message is received, the frequency measurement is performed based on the $1^{st}$ frequency priority list.

Preferably, an operating frequency of the at least one $2^{nd}$ communication module is excluded from the at least one frequency priority list or may be adjusted into a lowest priority in the at least one frequency priority list.

Preferably, the at least one $2^{nd}$ communication module includes comprises at least one of a transceiving module for a WiFi system, a Bluetooth transceiving module and a GPS (global positioning system) receiving module.

Preferably, the operation start of the at least one $2^{nd}$ communication module includes an operation of turning on a power of the at least one $2^{nd}$ communication module or a traffic transceiving operation of the at least one $2^{nd}$ communication module.

Advantageous Effects

According to the above-mentioned embodiments of the present invention, a user equipment is able to effectively evade ID interference.

Effects obtainable from the present invention may be non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 1:
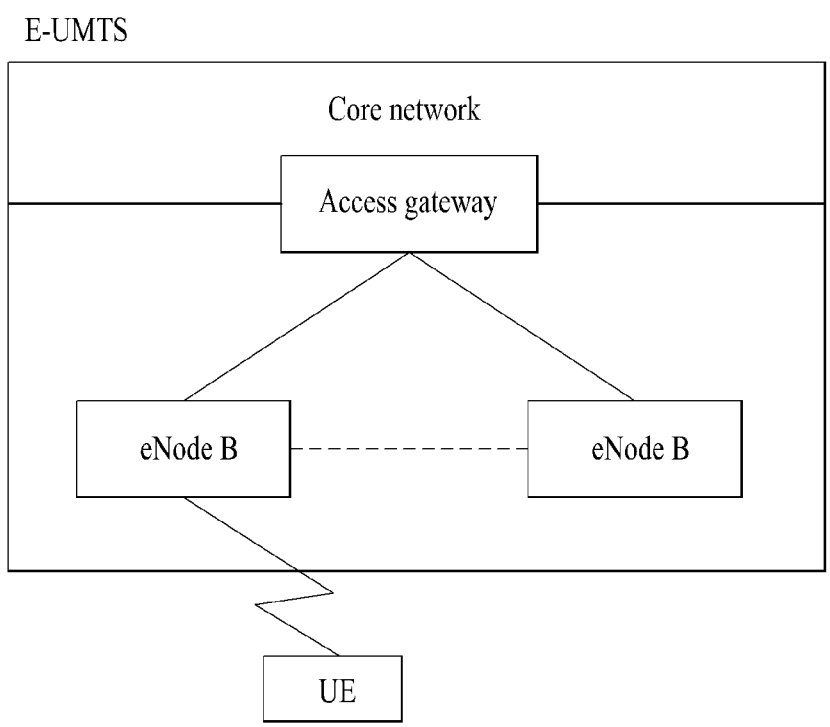
FIG. 1 is a schematic diagram of E-UMTS network structure as an example of a mobile communication system.
Figure 2:
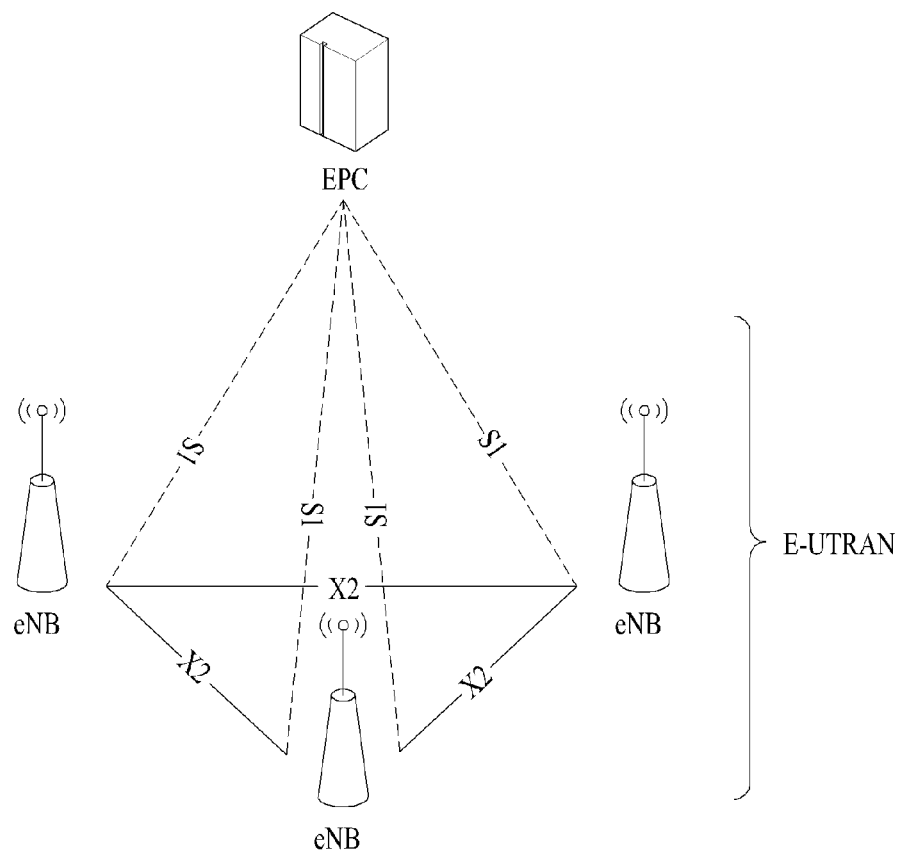
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
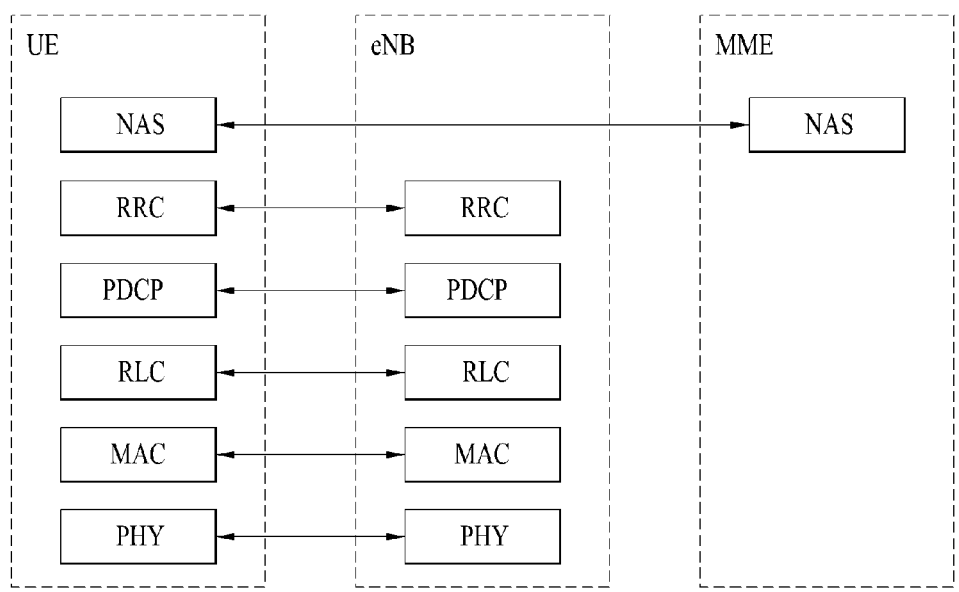
FIG. 3 is a diagram for structures of control and user planes of a radio interface protocol between a user equipment and E-UTRAN based on 3GPP radio access network specification.
Figure 3:
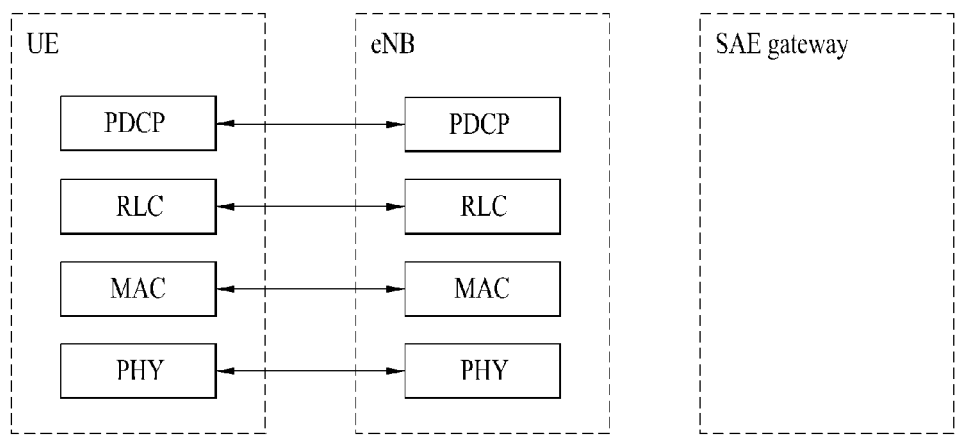

FIG. 3 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

In the following description, an RRC state of a user equipment and a corresponding RRC connecting method are explained. In this case, the RRC state means whether an RRC of a user equipment is logically connected to an RRC of E-UTRAN (i.e., logical connection). If the RRCs are connected to each other, it is called an RRC connected state (RRC_CONNECTED). If the RRCs are not connected to each other, it can be called an RRC idle state (RRC_IDLE).

Since E-UTRAN is able to obtain an existence of a user equipment in an RRC connected state by a cell unit, it is able to effectively control the user equipment. On the contrary, the E-UTRAN is unable to obtain a user equipment in an idle state by a cell unit and the corresponding user equipment is managed by a CN by a TA unit that is an area unit greater than a cell. In particular, in order to receive such a service as voice and data from a cell, a user equipment in an RRC idle state should make a transition to an RRC connected state.

Particularly, when a user initially turns on a power of a user equipment, the user equipment searches for an appropriate cell and then stays in an RRC idle state at the corresponding cell. If the user equipment staying in the RRC idle state needs to establish an RRC connection, it makes a transition to an RRC connected state by performing an RRC connection establishment process. In particular, if the RRC connection needs to be established, it means the case that an uplink data transmission is necessary due to user's call attempt or the like or the case that a response message needs to be sent in case of receiving a paging message from the E-UTRAN.

In the following description, a cell selection process and a cell reselection process are explained.

First of all, if a power of a user equipment is turned on, the user equipment selects a cell of an appropriate quality and should perform preparation procedures to receive a service. A user equipment in an RRC idle state selects a cell of an appropriate quality and should be then prepared for being provided with a service through the selected cell al the time. For instance, if a power of a user equipment is turned on just at the moment, the user equipment should select a cell of an appropriate quality to register with a network. Once the user equipment in the RRC connected state enters an RRC idle state, the corresponding user equipment should select a cell to stay in the RRC idle state. Thus, a process for a user equipment to select a cell, which meets a specific condition, to stay in such a service standby state as an RRC idle state is called a cell selection.

Since a user equipment performs a cell selection while failing in determining a cell to stay in an RRC idle state, it is very important to select a cell as quickly as possible. Hence, if a cell provides a radio signal quality over a predetermined level, although this cell does not provide a best radio signal quality to a user equipment, the corresponding cell may be selected in the course of a cell selecting process performed by the user equipment.

Once a user equipment selects a cell succeeding in meeting a cell selection reference, the user equipment obtains information required for an operation of the user equipment in an RRC idle state in the corresponding cell from system information of the corresponding cell. After the user equipment has receives all the information required for the operation of the user equipment in the RRC idle state, the user equipment stand by in the RRC idle state to make a request for a service to a network or to receive a service from the network.

After a user equipment has selected a prescribed cell by the cell selecting process, a strength or quality of a signal between the user equipment and a base station may change due to mobility of the user equipment, a radio environment fluctuation and the like. Therefore, if the quality of the selected cell is degraded, the user equipment may be able to select another cell that provides a better quality. Thus, if a cell is reselected, a cell capable of providing a signal quality better than that of a currently selected cell is selected in general. This process is called a cell reselection.

In aspect of a quality of a radio signal, the basic object of this cell reselecting process is to select a cell that provides a best quality to a user equipment in general. Beside the aspect of the radio signal quality, a network determines a priority for each frequency and may be then inform a user equipment of the determined priority. Having received the determined priority, the user equipment preferentially considers this priority in the cell reselecting process prior to the radio signal quality reference.

The above-mentioned cell reselection procedure may be categorized into Table 1 depending on radio access technology (RAT) of a cell and frequency characteristics.

TABLE 1

| Intra-frequency cell reselection | Reselect a cell having the same RAT and center frequency of a serving cell. |
| --- | --- |
| Inter-frequency cell reselection | Reselect a cell having the same RAT of a serving cell and a center frequency different from that of the serving cell. |
| Inter-RAT cell reselection | Reselect a cell using RAT different from that of a serving cell in use. |

Moreover, the user equipment is able to receive the frequency priority via a system information or an RRC connection release message or may receive the frequency priority from another RAT in case of inter-RAT cell reselection.

In the following description, IDC (in-device coexistence) and IDC interference are explained.

First of all, in order for a user to access various networks anytime and at any place, it may be necessary for a single user equipment to be equipped with transceivers for wireless communication systems including LTE, WiFi, Bluetooth (BT) and the like and a GNSS (global navigation satellite system). Thus, if various kinds of different wireless communication systems coexist in a single user equipment, it shall be named IDC (in-device coexistence). For instance, such a user equipment may include one of a user equipment equipped with LTE and BT modules to receive a VoIP service and a multimedia service using a BT earphone, a user equipment equipped with LTE and WiFi modules for traffic distribution, a user equipment equipped with GNSS and LTE modules to additionally obtain location information, and the like.

Figure 4:
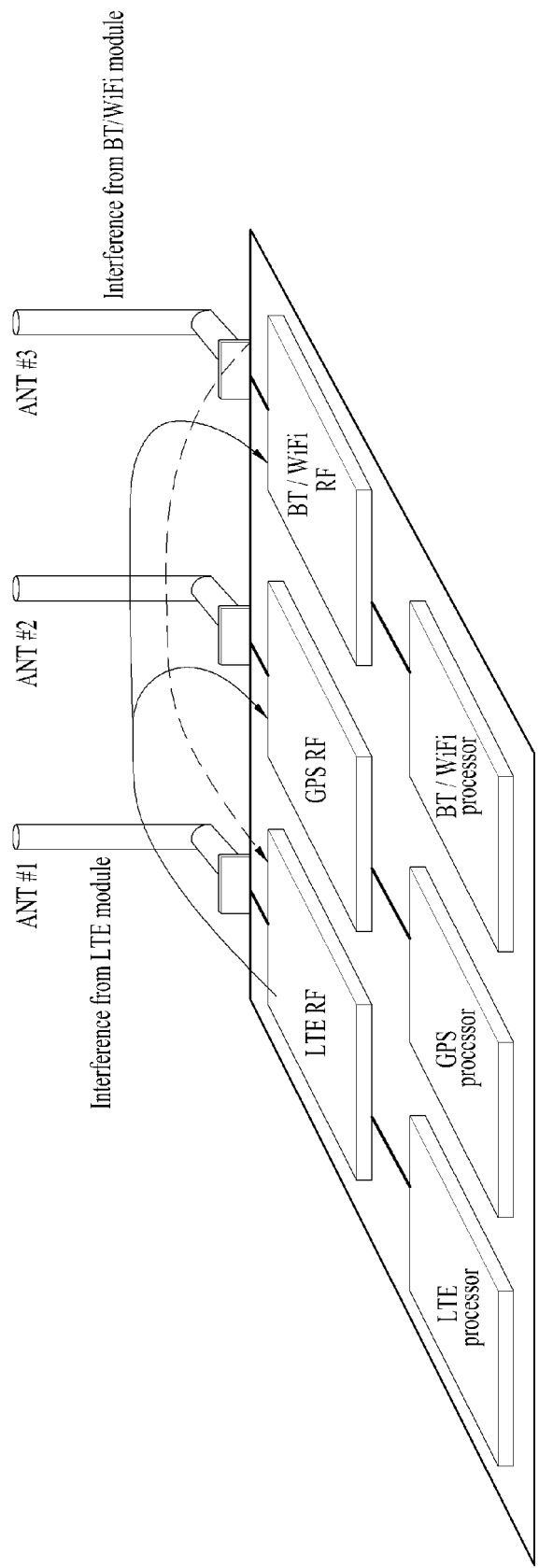
FIG. 4 is a diagram for one example of a user equipment including wireless communication modules for LTE system, GPS (global positioning system), and BT/WiFi system.

FIG. 4 is a diagram for one example of a user equipment including wireless communication modules for LTE system, GPS (global positioning system), and BT/WiFi system.

Referring to FIG. 4, in case of the above-described user equipment, since several transceivers are located close to each other, it happens that a power of a signal transmitted from one transmitter may be greater than that of a signal received by another receiver. In this case, interference may be generated between different communication modules, which may be called IDC interference. If the IDC interference gets more serious, it may bring a ping-pong effect that a handover is consecutively attempted despite that a connection to a base station has no problems.

Generally, the above-mentioned communication modules may affect mutual interference by operating at contiguous frequencies in aspect of frequency as follows.

First of all, an LTE module may operate in TDD Band 40 (e.g., 2,300 MHz~2,400 MHz) and a WiFi module or a Bluetooth module may operate in unlicensed band of 2,400 MHz~2,483.5 MHz. In this case, the transmission from the LTE module may cause interference to the WiFi module or the Bluetooth module. On the contrary, the transmission from the WiFi module or the Bluetooth module may cause interference to the reception by the LTE module.

Secondly, an LTE module may perform an uplink transmission in FDD Band 7 (e.g., 2,500 MHz~2,700 MHz) and a Bluetooth module may operate in unlicensed band of 2,400 MHz~2,483.5 MHz. In this case, the uplink transmission from the LTE module may cause interference to the reception by the WiFi module or the Bluetooth module.

Thirdly, an LTE module may operate in FDD Band 13 (UL: 777 MHz~787 MHz, DL: 746 MHz~756 MHz) or FDD Band 13 (UL: 788 MHz~798 MHz, DL: 758 MHz~768 MHz) and a GPS module may be able to receive location information at 1,575.42 MHz. In this case, the uplink transmission from the LTE module may cause interference to the location information reception by the GPS module.

According to one of solutions for these problems, if physical filters are sufficiently spaced apart or a sufficient interval is provided between frequencies of tranmsitte4d and received signals, it may be able to prevent the occurrence of the IDC interference between two transceivers. Yet, in case that several wireless communication modules operate at contiguous frequencies, it may be difficult for the current filter technology to appropriately suppress the interference.

Aside from a method of applying the physical filter scheme, the IDC interference evasion scheme may consider the following 3 kinds of cases depending on a presence or non-presence of coordination with another communication module coexisting with LTE module or a presence or non-presence of coordination for IDC interference removal between an LTE module and a base station.

In the 1$^{st}$ case, there is no coordination for IDC interference evasion between communication modules coexisting in a single user equipment and between an LTE module and a base station. In this case, the LTE module is not aware of other coexisting communication modules.

In the 2$^{nd}$ case, there is coordination only between communication modules coexisting in a user equipment. In this case, operating states (i.e., ON/OFF state), traffic transmission states and the like can be known between the coexisting modules.

In the 3$^{rd}$ case, coordination exists between a user equipment and a base station as well as between modules coexisting in the user equipment. An LTE module coordinates with other modules and is able to measure IDC interference through inter/intra frequency measurement.

In order for 3GPP to resolve the IDC interference, 1) a method for an interfering communication module or an interfered communication module to change a frequency [FDM: frequency division multiplexing], 2) a method for coexisting communication modules to use a single frequency by time splitting [TDM: time division multiplexing], and 3) a method of reducing interference on another coexisting module in a manner that an LTE module adjusts a transmit power are currently taken into consideration. And, detailed methods and procedures are currently discussed by the 3GPP.

As mentioned in the foregoing description, since the IDC interference is the problem resulting from an inside of a single user equipment, a base station is not aware of the IDC interference occurrence unless the corresponding user equipment informs the base station of the event of the IDC interference occurrence. In this case, the base station may deliver cell reselection priority information to the corresponding user equipment without considering the frequency at which the IDC interference occurs.

In particular, an IDC interfered frequency may have a highest priority in a cell reselection priority list. If an LTE module in RC idle state performs a cell reselection without considering the ID interference occurring frequency, the following problems may be caused.

First of all, it may cause a problem that an unnecessary measurement is performed. In particular, the LTE module in the RRC idle state periodically measures a frequency having a priority higher than that of a currently serviced frequency in order to move away into a cell of a better quality. Yet, a frequency, at which IDC interference occurs due to another communication module, is not suitable as a target of a cell reselection due to the already-occurring interference. Nonetheless, in case that the IDC interfered frequency has a high priority in the received cell reselection priority list, the LTE module keeps measuring priorities, thereby consuming energy unnecessarily.

Secondly, it may cause a problem that an unnecessary cell reselection or handover is performed. In particular, since a quality of a reselected cell is degraded due to a traffic transmission of another coexisting communication module, the LTE module may have to keep performing the cell reselection. Moreover, when an RRC connection to a base station is established in the reselected cell, it may be necessary to immediately perform a handover due to the IDC interference. This is an unnecessary operation if the cell reselection is performed in consideration of the IDC interference occurring frequency.

Therefore, according to the present invention, in a method of evading interference, which occurs when an LTE module in an RC idle state and at least one coexisting communication module within a user equipment simultaneously operates at contiguous frequencies, in case that the coexisting communication module starts to operate, a method for the LTE module to exclude an interference occurring frequency or a frequency, at which an interference may occur, by adjusting reselection priorities is proposed as a 1$^{st}$ embodiment or a 2$^{nd}$ embodiment as follows. In this case, the LTE module is able to obtain an operation start of another communication module through coordination within the user equipment.

<1$^{st}$ Embodiment>

According to a 1$^{st}$ embodiment of the present invention, assume a case that an LTE module receives reselection priority list information from a base station. In this case, if the LTE module recognizes an operation start of another communication module, a frequency, at which the LTE module gives an IDC interference to another communication module, or a frequency, at which the LTE module receives an IDC interference from another communication module, is set to a lowest priority in a saved cell reselection priority list received from the base station. And, other frequencies in the list maintain their priorities as they are.

Alternatively, it may be able to exclude a frequency, at which the LTE module gives an IDC interference to another communication module, or a frequency, at which the LTE module receives an IDC interference from another communication module, from the priority list. In this case, a cell reselection is attempted using a priority list of the rest of the frequencies in the former priority list.

Figure 5:
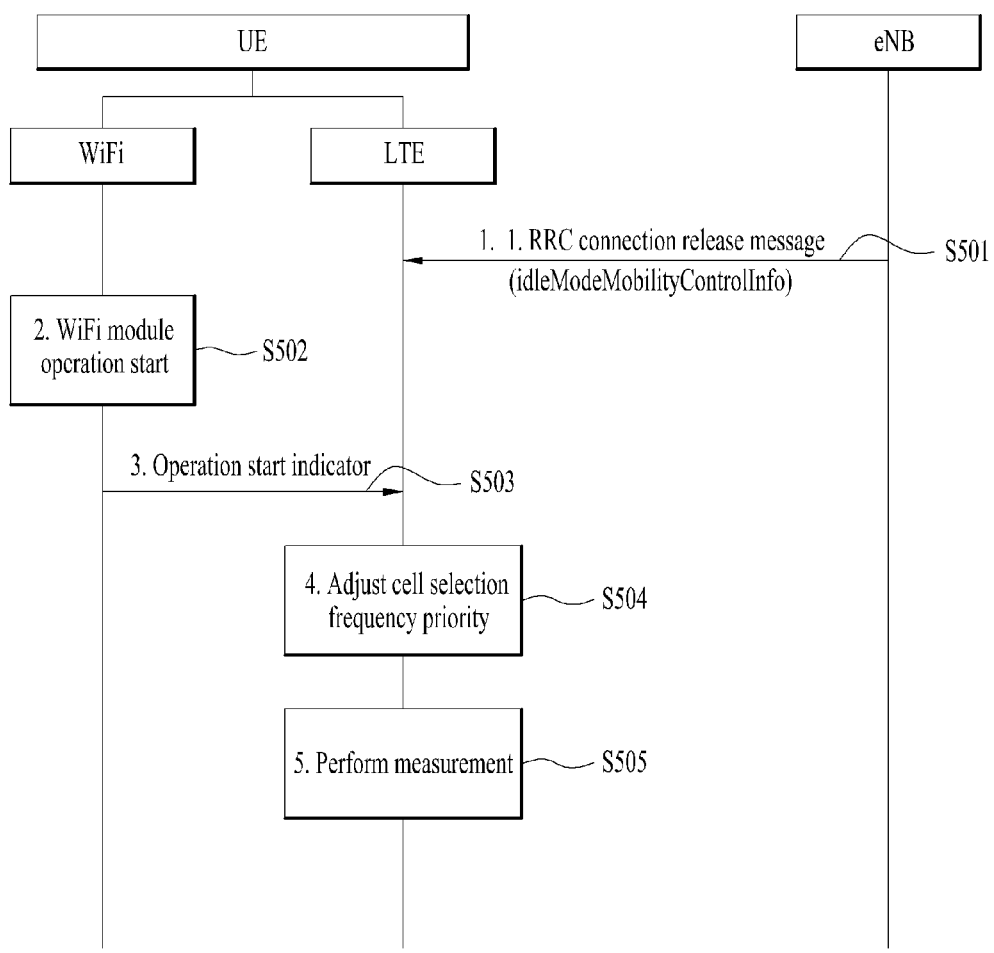
FIG. 5 is a diagram for a method of adjusting a cell reselection priority list according to a $1^{st}$ embodiment of the present invention.

FIG. 5 is a diagram for a method of adjusting a cell reselection priority list according to a 1st embodiment of the present invention. Particularly, when WiFi and LTE modules coexisting in a user equipment operate at contiguous frequencies, if the WiFi module corresponding to a coexisting communication module starts to operate, the LTE module in an RRC idle state performs an operation of performing a cell reselection using a reselection priority list. And, assume that the LTE module receives a reselection priority list via an RRC connection release message.

Referring to FIG. 5, when an LTE module in an RRC connected state (RRC_CONNECTED) intends to release an RRC connection, a base station delivers frequency priority information for a cell reselection to the LTE module of a user equipment using a field 'idleModeMobilityControlInfo' in an RRC connection release message in order for the LTE module to perform the cell reselection in an RRC idle state later [S501].

Subsequently, in order to transmit data using a WiFi module, the user equipment may start an operation of the WiFi module [S502]. In doing so, in order for the LTE module to obtain information on IDC interference, the WiFi module may deliver an operation start indicator including such information as an operating frequency of the WiFi module, a transmit power and the like to the LTE module [S503].

Having recognized the operation start of the WiFi module, the LTE module adjusts cell reselection frequency priorities in a manner that an LTE module interfered frequency or an LTE module interfering frequency has a lowest priority [S504]. Finally, the LTE module performs a measurement for the cell reselection based on the adjusted frequency priorities [S505].

<$2^{nd}$ Embodimen>

According to a $2^{nd}$ embodiment of the present invention, assume a case that an LTE module receives at least two reselection priority lists from a base station.

The reselection priority list A among the at least two reselection priority lists indicates the information used by the LTE module in case that another communication module does not operate. And, the reselection priority list B indicates the information used by the LTE module in case that another communication module starts to operate.

To this end, a network is able to deliver information on the at least two reselection priority lists via an RRC connection release message or a message received by a user equipment from another RAT.

Figure 6:
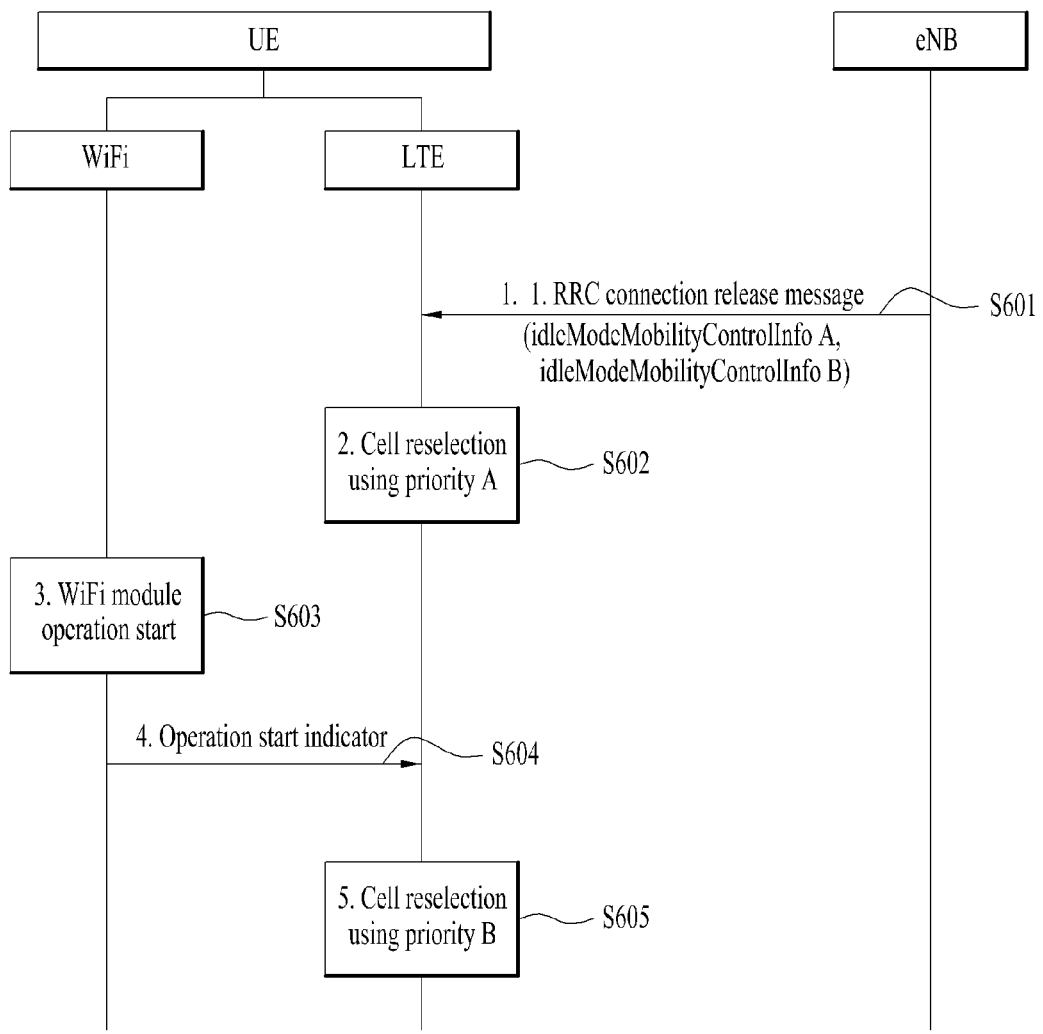
FIG. 6 is a diagram for a method of adjusting a cell reselection priority list according to a $2^{nd}$ embodiment of the present invention.

FIG. 6 is a diagram for a method of adjusting a cell reselection priority list according to a $2^{nd}$ embodiment of the present invention. Likewise, FIG. 6 assumes the following case. First of all, when WiFi and LTE modules coexisting in a user equipment operate at contiguous frequencies, the WiFi module corresponding to a coexisting communication module starts to operate. And, assume that the LTE module receives two reselection priority lists via an RRC connection release message.

Referring to FIG. 6, when an LTE module in an RRC connected state (RRC_CONNECTED) intends to release an RRC connection, a base station delivers frequency priority information for a cell reselection to the LTE module of a user equipment using a field 'idleModeMobilityControlInfo' in an RRC connection release message in order for the LTE module to perform the cell reselection in an RRC idle state later [S601]. In particular, in order to use a different frequency priority list depending on whether another coexisting communication module operates, idleModeMobilityControlInfo A and idleModeMobilityControlInfo B are transmitted. The idleModeMobilityControlInfo A indicates cell reselection frequency priority information used by the LTE module when another communication module does not operate. And, the idleModeMobilityControlInfo B indicates cell reselection frequency priority information used by the LTE module when another communication module operates.

Since a WiFi module does not operate, the LTE module performs a cell reselection using the frequency priority list A included in the idleModeMobilityControlInfo A [S602].

Subsequently, in order to transmit data using the WiFi module, the user equipment may start an operation of the WiFi module [S603]. In doing so, in order for the LTE module to obtain information on IDC interference, the WiFi module may deliver an operation start indicator including such information as an operating frequency of the WiFi module, a transmit power and the like to the LTE module [S604].

Having recognized the operation start of the WiFi module, the LTE module performs the cell reselection using the frequency priority list included in the idleModeMobilityControlInfo B, i.e., the frequency priority list B considering the ID interference [S605].

As another communication module coexisting in the user equipment starts to operate, when the IDC interference is expected to occur, the LTE module in the RRC idle state effective adjusts the cell reselection priority list received from the network, thereby reducing unnecessary handovers that may be generated from an unnecessary measurement, an unnecessary cell reselection and a connection to the network.

Figure 7:
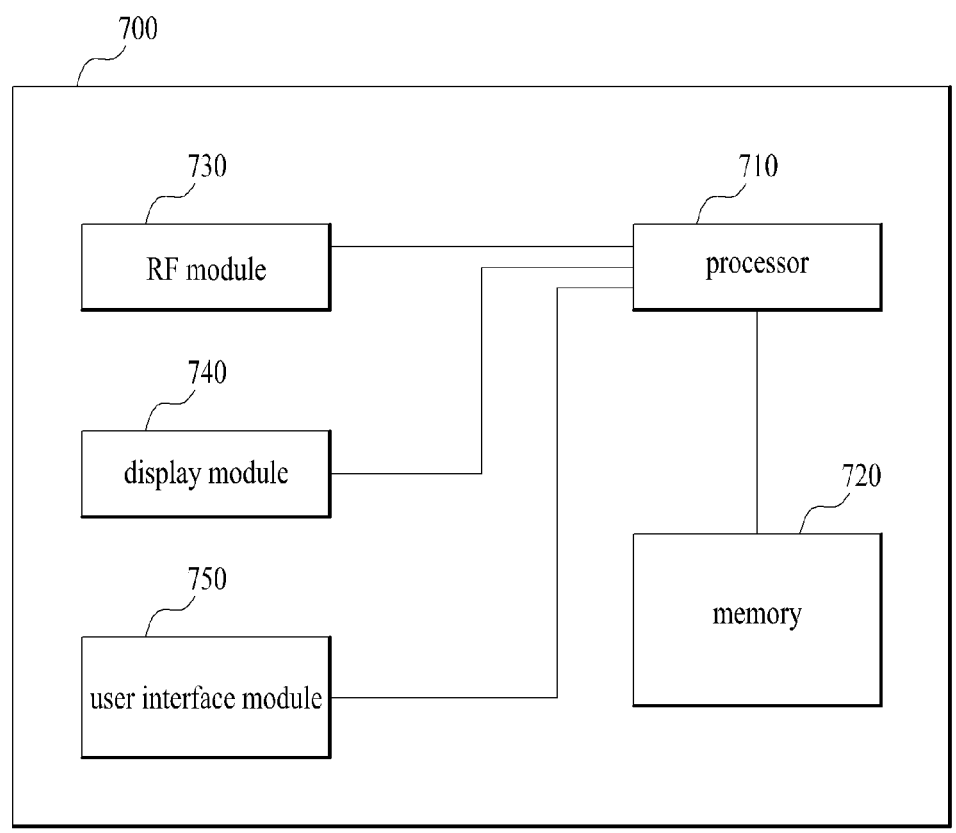
FIG. 7 is a block diagram for one example of a communication transceiver according to one embodiment of the present invention.

FIG. 7 is a block diagram for one example of a communication transceiver according to one embodiment of the present invention.

Referring to FIG. 7, a transceiver 700 includes a processor 710, a memory 720, an RF module 730, a display module 740 and a user interface module 750.

The transceiver 700 is illustrated for clarity and convenience of the description and some modules can be omitted. Moreover, the transceiver 700 is able to further include at least one necessary module. And, some modules of the transceiver 700 can be further divided into sub-modules. The processor 710 is configured to perform operations according to the embodiment of the present invention exemplarily described with reference to the accompanying drawings.

In particular, in case that the transceiver 700 is a part of a base station, the processor 710 may perform a function of generating a control signal and then mapping the generated control signal to a control channel set within a plurality of frequency blocks. In case that the transceiver 700 is a part of a user equipment, the processor 710 checks the control channel indicated to itself from a signal received via a plurality of the frequency blocks and is then able to extract the control signal from the control signal.

Subsequently, the processor 710 may be able to perform necessary operations based on the control signal. The detailed operations of the processor 710 can refer to the contents described with reference to FIGS. 1 to 6.

The memory 720 is connected to the processor 710 and stores an operating system, applications, program codes, data and the like. The RF module 730 is connected to the processor 710 and performs a function of converting a baseband signal to a radio signal or converting a radio signal to a baseband signal. To this end, the RF module 730 performs analog conversion, amplification, filtering and frequency uplink transform or inverse processes thereof. The display module 740 is connected to the processor 710 and displays various kinds of informations. The display module 740 can include such a well-known element as LCD (Liquid Crystal Display), LED (Light Emitting Diode), OLED (Organic Light Emitting Diode) and the like, by which the present invention is non-limited. The user interface module 750 is connected to the processor 710 and can include a combination of well-known interfaces including a keypad, a touchscreen and the like.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention are described centering on the data transmission/reception relations between a relay node and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like. And, a user equipment can be replaced by such a terminology as a UE (user equipment), an MS (mobile station), an MSS (mobile subscriber station) and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of adjusting a cell reselection priority for an IDC interference evasion in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of performing a measurement for a cell reselection by a $1^{st}$ communication module for a $1^{st}$ communication system of a user equipment, the method comprising:
receiving a $1^{st}$ message including a frequency priority list for the $1^{st}$ communication system from a base station of the $1^{st}$ communication system;
receiving a $2^{nd}$ message from at least one $2^{nd}$ communication module for a $2^{nd}$ communication system coexisting in the user equipment; and
if the $2^{nd}$ message indicates an operation start of the at least one $2^{nd}$ communication module, performing a frequency measurement based on the frequency priority list and an operating frequency information of the $2^{nd}$ communication module included in the $2^{nd}$ message,
wherein performing the frequency measurement comprises excluding at least one of the operating frequency of the at least one $2^{nd}$ communication module and a specific frequency from the frequency priority list,
wherein the operating frequency of the at least one $2^{nd}$ communication module is a frequency at which the at least one $2^{nd}$ communication module causes interference to the $1^{st}$ communication system, and
wherein the specific frequency is a frequency at which the $1^{st}$ communication system causes interference to the at least one $2^{nd}$ communication module.

2. The method of claim 1, wherein if the measurement for the cell reselection is performed before the $2^{nd}$ message is received, the frequency measurement is performed only based on the frequency priority list.

3. The method of claim 1, wherein the at least one $2^{nd}$ communication module comprises at least one selected from the group consisting of a transceiving module for a WiFi system, a Bluetooth transceiving module and a GPS (global positioning system) receiving module.

4. The method of claim 1, wherein the operation start of the at least one $2^{nd}$ communication module comprises either an operation of turning on a power of the at least one $2^{nd}$ communication module or a traffic transceiving operation of the at least one $2^{nd}$ communication module.

5. A user equipment in a wireless communication system, the user equipment comprising:
a $1^{st}$ communication module configured to transceive signals with a $1^{st}$ communication system; and
at least one $2^{nd}$ communication module configured to transceive signals with a $2^{nd}$ communication system,
wherein the $1^{st}$ communication module receives a $1^{st}$ message including a frequency priority list for the $1^{st}$ communication system from a base station of the $1^{st}$ communication system,
wherein the $1^{st}$ communication module receives a $2^{nd}$ message from at least one $2^{nd}$ communication module coexisting in the user equipment, and wherein if the $2^{nd}$ message indicates an operation start of the at least one $2^{nd}$ communication module, the $1^{st}$ communication module performs a frequency measurement based on the frequency priority list and an operating frequency information of the $2^{nd}$ communication module included in the $2^{nd}$ message, wherein the $1^{st}$ communication module excludes the operating frequency of the at least one $2^{nd}$ communication module and a specific frequency from the frequency priority list, wherein the operating frequency of the at least one $2^{nd}$ communication module is a frequency at which the at least one $2^{nd}$ communication module causes interference to the $1^{st}$ communication system, and wherein the specific frequency is a frequency at which the $1^{st}$ communication system causes interference to the at least one $2^{nd}$ communication module.

6. The user equipment of claim 5, wherein if the measurement for the cell reselection is performed before the $2^{nd}$ message is received, the $1^{st}$ communication module performs the frequency measurement only based on the frequency priority list.

7. The user equipment of claim 5, wherein the at least one $2^{nd}$ communication module comprises at least one selected from the group consisting of a transceiving module for a WiFi system, a Bluetooth transceiving module and a GPS (global positioning system) receiving module.

8. The user equipment of claim 5, wherein the operation start of the at least one $2^{nd}$ communication module comprises either an operation of turning on a power of the at least one $2^{nd}$ communication module or a traffic transceiving operation of the at least one $2^{nd}$ communication module.

* * * * *